(12) United States Patent
Lagarrigue et al.

(10) Patent No.: US 9,482,141 B2
(45) Date of Patent: Nov. 1, 2016

(54) RAPID COOLING DEVICE FOR A MOTOR VEHICLE COMPRISING A COMPONENT FITTED WITH A DIFFUSER

(71) Applicant: RENAULT s.a.s., Boulogne-Billancourt (FR)

(72) Inventors: Olivier Lagarrigue, Guyancourt (FR); David Grimault, Chaville (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/383,234

(22) PCT Filed: Mar. 1, 2013

(86) PCT No.: PCT/FR2013/050443
§ 371 (c)(1),
(2) Date: Sep. 5, 2014

(87) PCT Pub. No.: WO2013/132179
PCT Pub. Date: Sep. 12, 2013

(65) Prior Publication Data
US 2015/0047802 A1    Feb. 19, 2015

(30) Foreign Application Priority Data

Mar. 6, 2012   (FR) ..................................... 12 52034

(51) Int. Cl.
*A62C 3/07*        (2006.01)
*F01P 3/20*        (2006.01)
(Continued)

(52) U.S. Cl.
CPC .............. *F01P 3/20* (2013.01); *B60R 13/0838* (2013.01); *B60R 13/0869* (2013.01); *B60R 13/0876* (2013.01); *F01P 3/12* (2013.01);

*H01M 2/04* (2013.01); *H01M 10/613* (2015.04); *H01M 10/625* (2015.04); *H01M 10/6568* (2015.04); *A62C 3/07* (2013.01); *A62C 35/08* (2013.01);
(Continued)

(58) Field of Classification Search
CPC ........... F01P 3/12; A62C 3/07; A62C 35/08; A62C 35/10; A62C 35/023
See application file for complete search history.

(56) References Cited

U.S. PATENT DOCUMENTS 3,827,502 A     8/1974  Lockwood
2005/0167169 A1  8/2005  Gering et al.
(Continued)

FOREIGN PATENT DOCUMENTS

EP         2 332 616 A1      6/2011
FR         EP 1961459 A1 *   8/2008 ............... A62C 3/07
(Continued)

OTHER PUBLICATIONS

Machine translation of EP 1961459 A1, accessed on Mar. 8, 2016.*
International Search Report issued May 3, 2013, in PCT/FR13/050443 filed Mar. 1, 2013.

*Primary Examiner* — Jonathan Matthias
(74) *Attorney, Agent, or Firm* — Oblon, McClelland, Maier & Neustadt, L.L.P.

(57) ABSTRACT

A rapid cooling device for a motor vehicle including a motor vehicle component performing a first technical function of covering for a proximal surface opposite it, the vehicle component including a diffusion mechanism for performing a technical function of rapidly diffusing a liquid that has been injected toward the proximal surface opposite it, with a view to reducing a surface temperature of the proximal surface opposite it.

11 Claims, 2 Drawing Sheets

(51) Int. Cl.
*B60R 13/08* (2006.01)
*F01P 3/12* (2006.01)
*H01M 2/04* (2006.01)
*H01M 10/625* (2014.01)
*H01M 10/6568* (2014.01)
*H01M 10/613* (2014.01)
*A62C 35/08* (2006.01)
*A62C 35/10* (2006.01)
*H01M 2/10* (2006.01)
*H01M 10/6554* (2014.01)

(52) U.S. Cl.
CPC ............ *A62C 35/10* (2013.01); *H01M 2/1077* (2013.01); *H01M 2/1083* (2013.01); *H01M 10/6554* (2015.04); *H01M 2200/20* (2013.01)

(56) References Cited

U.S. PATENT DOCUMENTS

| | | | |
|---|---|---|---|
| 2006/0117754 A1* | 6/2006 | Hunt | 60/651 |
| 2006/0187000 A1 | 8/2006 | Fitzpatrick | |
| 2008/0078542 A1 | 4/2008 | Gering et al. | |
| 2009/0205846 A1* | 8/2009 | Zeweke et al. | 169/45 |
| 2012/0002338 A1* | 1/2012 | Smith et al. | 361/116 |
| 2012/0047893 A1 | 3/2012 | Hoshi et al. | |

FOREIGN PATENT DOCUMENTS

| | | |
|---|---|---|
| FR | 2 942 920 | 9/2010 |
| GB | 1 604 410 | 12/1981 |
| GB | 2 205 037 A | 11/1988 |

* cited by examiner

RAPID COOLING DEVICE FOR A MOTOR VEHICLE COMPRISING A COMPONENT FITTED WITH A DIFFUSER

The present invention relates to a cooling device for a motor vehicle comprising a motor vehicle component that performs a first technical function of covering and a second function of diffusing, and to a vehicle equipped with such a device.

The invention relates in particular to a first component which performs a covering function for a component opposite so as to prevent the spread and transmission of heat between this component opposite and an element of the vehicle. The component opposite may be any hot component, for example any hot component inside the engine compartment such as an exhaust manifold or even a battery. The first component, sometimes referred to as a screen, may be any element that protects or covers this hot component.

The first technical function of protecting or covering may have many objectives, first of all that of preventing heat from spreading and damaging components situated nearby, such as the electrovalves situated under the exhaust manifold as explained in application FR2939840 for example, or that of preventing heat from spreading to intermediate components in touch with the occupant, such as the bulkhead, as this could cause heat to pass between the engine compartment and the vehicle interior.

The vehicle component performs a first function of covering. It may sometimes happen that the first function of covering is not always performed satisfactorily and, in certain specific cases, for example in an impact situation, in order to prevent this first covering function from failing as a result for example of damage to the cover and with the objective of avoiding any passage of heat toward the vehicle interior, the idea of a second function of rapid cooling riding piggyback on this first function of covering has been conceived of, for this component. This second function of rapid cooling is performed by means of a diffuser incorporated into the component.

The objective is, by rapidly diffusing a liquid, for example water, a water-based compound or any other liquid, to obtain a rapid lowering of the surface temperature of the surface of the hot component.

The rapid lowering of temperature reduces the risks of heat being transmitted to the vehicle interior which could be caused by a failure of the covering element. Failure of the covering element is in this case imagined to be essentially by chance or by accident, for example following a violent impact that might reduce the imperviousness of its cover as a result of damage. The objective being to compensate for a failure of the first function of covering using a second function of rapid cooling, performed additionally and by the same component.

This objective is achieved by virtue of the invention which proposes a rapid cooling device for a motor vehicle comprising a motor vehicle component that performs a first technical function of covering for a proximal surface opposite it, characterized in that the vehicle component comprises diffusion means for performing a technical function of rapidly diffusing an injected liquid toward said proximal surface opposite, with the purpose of reducing the surface temperature of said proximal surface opposite, and in that the liquid is injected under the action of a pyrotechnically triggered external command.

Thus advantageously, in the event of an impact that could cause damage to the covering function of the component, a liquid is very rapidly diffused by this component toward the hot component opposite, thus allowing the temperature of the component opposite to be lowered. The lowering of the temperature of the hot component makes it possible to reduce the risks associated with the heat of the component and therefore contain in this way the random factors in the spread of heat toward the vehicle interior which could occur in the event of damage. The injection and rapid spread of liquid provides better effectiveness in the reducing of temperature with a view to limiting the transmission of heat. In the special case of batteries, the earlier this reduction in temperature can be achieved, i.e. just after the violent impact, the more effective it is. The speed with which liquid is injected is obtained by the action of the pyrotechnically triggered external command.

The invention thus makes it possible to ensure continuity in the limiting of the spread of heat, notably in the event of an impact, thanks to a rapid cooling function which is added to a first function of covering.

Advantageously, these two functions are performed by one and the same component, making it possible notably to save on components and to save mass at vehicle level.

In preferred embodiments of the invention it is possible if appropriate, in addition to using the above features, to have recourse to one or another of the following measures considered alone or in combination:

- The vehicle component comprises diffusion means produced by a diffusion assembly taking the form of passages formed inside the same.
- The passages formed are of tubular shape.
- The liquid is injected into the vehicle component under the action of an external command.
- The vehicle component comprises a fusible element at the inlet to the diffusion assembly that opens to allow the liquid to pass if the external liquid-injection command is triggered.
- The motor vehicle component is a heat screen of the engine compartment.
- The surface opposite the vehicle component is a surface of an exhaust manifold.
- The vehicle component is a battery pack cover and the surface opposite is a surface of a battery module.
- The liquid is water-based.
- The external command is pyrotechnically triggered.

Finally, the invention also relates to a motor vehicle comprising a rapid cooling device according to any one of the preceding features considered alone or in combination.

Other features and advantages of the invention will become apparent during the course of the following description of a number of the embodiments thereof which are given by way of nonlimiting examples with reference to the attached drawings. In the context of the present application, the terms "front", "rear", "left", "right" are to be understood with reference to the conventional frame of reference of motor vehicles. Moreover, in various figures, the same references denote elements that are identical or similar.

Figure 1:
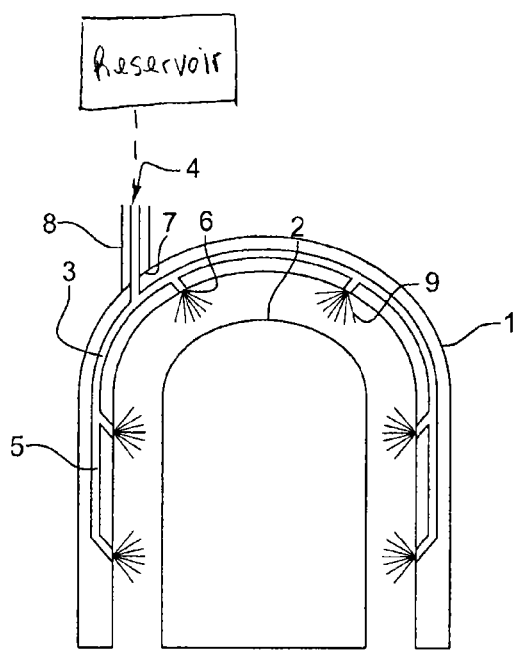
FIG. 1 is a schematic diagram of the invention.

FIG. 1 shows the principle of the rapid cooling device according to the invention. A motor vehicle component 1 performs a first technical function of covering for a hot proximal surface 2 opposite it. It also comprises means 3 for performing an additional technical function of rapidly diffusing an injected liquid 4 toward said proximal surface opposite, with the purpose of reducing the surface temperature of said proximal surface 2 opposite. The liquid is injected very rapidly into the vehicle component, for example under the action of an external generator (not shown in the drawings) which may be pyrotechnically triggered. The triggering in this case is carried out by the computer which sets off the other vehicle safety equipment, for example the airbag safety devices. The external generator is provided with a reservoir (schematically shown in FIG. 1) containing the liquid which is conveyed by a supply line to the inlet of the vehicle component, by the pressure applied by the gases produced by the pyrotechnic triggering. Such a pyrotechnically triggered command provides the speed and pressure required for injecting the liquid. Advantageously, the pyrotechnically triggered command makes it possible to dispense with the need for a device for keeping the liquid under pressure.

The vehicle component comprises a fusible element 7 at the inlet 8 to the diffusion assembly 3, and this fusible element 7 opens to allow the liquid 4 from the reservoir of the generator access to the diffusion circuit 3 located inside the vehicle component 1. The supply line in this particular instance is empty. Alternatively, the liquid may be placed in the supply line from the generator and tank as far as the inlet 8 to the diffusion assembly. In this case, the supply line acts as an additional reservoir. The diffusion assembly 3 takes the form of passages 5 or ducts formed inside the cover component. They advantageously allow the liquid to be brought as close as possible to the zone that is to be cooled. The tubes or channels open onto the interior wall of the cover component that faces the hot surface. Advantageously, the open ends 6 are positioned as close as possible to the hot zone that is to be cooled, on the basis of predetermined information from the thermal mapping of the hot surface of the component opposite. The open ends of the passage circuit are positioned as close as possible to the hottest zones, in a way that is thus highly targeted with a view to obtaining maximum effectiveness in the lowering of the temperature. Liquid is diffused toward the component either by flowing toward the hot component or by jet. The end 6 of the channel may consist of a diffusion nozzle 9 or simply of a hole. Advantageously, the diffusion orifice 6 is situated at a passage end and each terminal branch of a passage 5 is connected to just one diffusion end, making it possible to improve the circulation of liquid inside the diffusion circuit.

Figure 2:
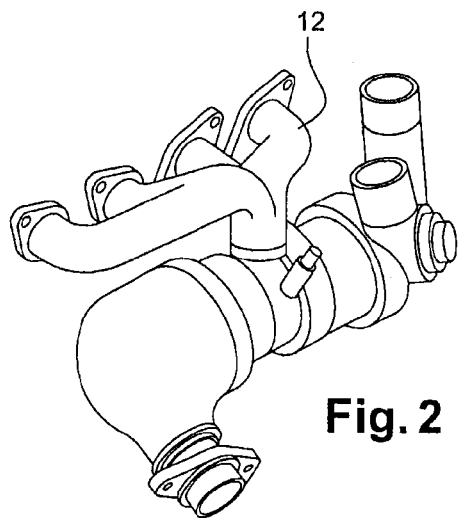
FIG. 2 is a view of an exhaust manifold according to a first embodiment.
Figure 3:
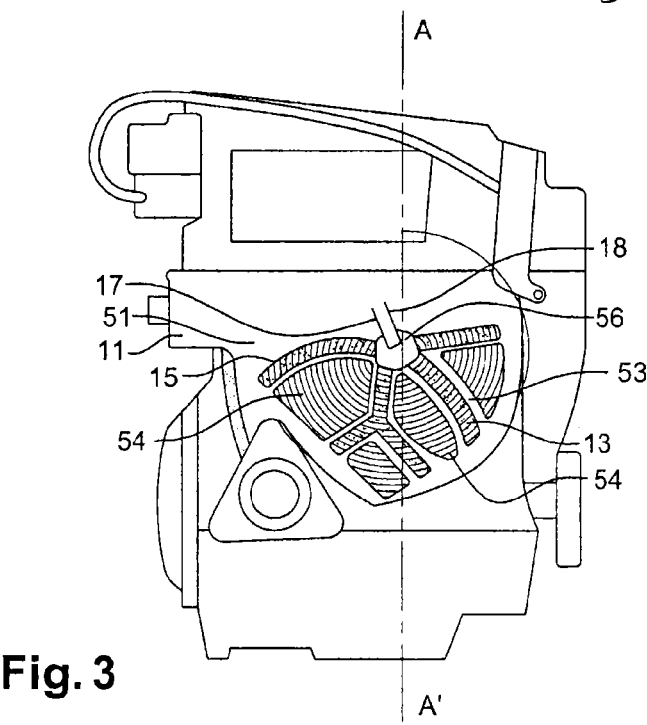
FIG. 3 is an example of a heat screen according to the invention, placed on an exhaust manifold, according to a first embodiment.
Figure 4:
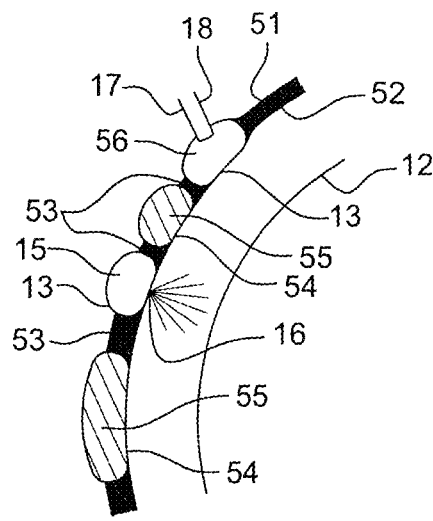
FIG. 4 is a view in section on AA' of FIG. 3.
Figure 5:
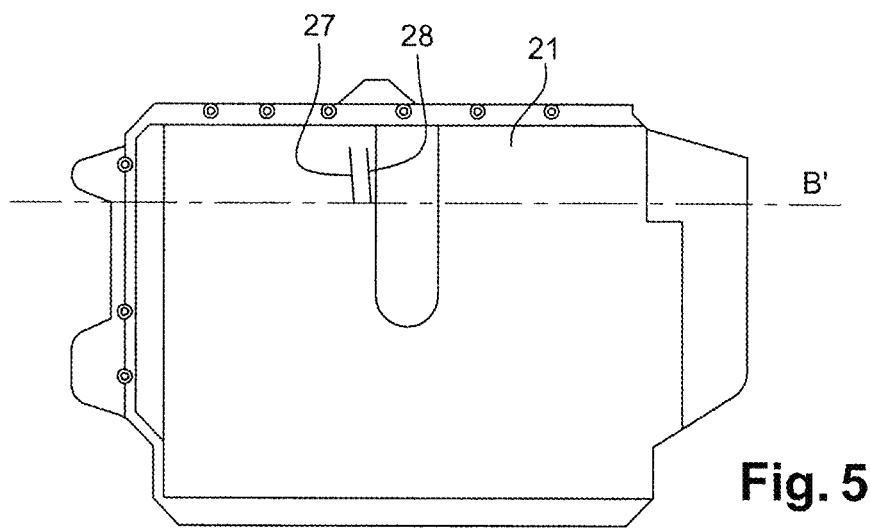
FIG. 5 shows a battery according to a second embodiment.

In a first embodiment, the surface opposite is a surface of an exhaust manifold 12 as depicted in FIG. 2 and the covering vehicle component is a heat screen 11 of the engine compartment as depicted in FIG. 3. The exhaust manifold 12 is one of the hottest components in the engine compartment. It is made of steel or cast iron with a thickness of around 4 to 6 mm. In operation its temperature may reach around 800° C. The heat screen provides containment of the heat emitted by the manifold, preventing heat from spreading toward the vehicle interior. The heat screen is, as can be seen in FIG. 4, made of two jackets, an outer jacket 51 and an inner jacket 52, between which jackets the liquid diffusion circuit 13 is positioned. The heat screen is made of a relatively rigid material, for example from sheets of steel or of embossed aluminum, in the case of the outer jackets. These sheets are joined together, notably by welding, at certain welding spaces 53 which are defined in such a way as to fix a path 13 of channels that diffuse the injected liquid. The passages 15 that diffuse the liquid are substantially tubular. As depicted in FIGS. 4 and 5, the outer sheets may have a relief of curved exterior shapes marking the location of the passage tubes. Insulating surfaces 54 produced by a gap 55 filled with air between the two jackets may be incorporated in between the outer 51 and inner 52 jackets, away from the diffusion circuit 13 and from the spaces joined together by welding in order to define the diffusion circuit. As an alternative, in an embodiment that has not been depicted, thermally insulating material may be placed inside the two jackets and the passage circuit may then consist of passages formed within the insulating material situated in the space between the two jackets. As an alternative, a passage circuit consisting of prefabricated tubes made of insulating material is conceivable, which tubes would be placed between the two, inner and outer, jackets ensuring a connection at the inlet and to each outlet orifice.

The objective of the cooling device is to lower the temperature by around 100° to 200° in order to obtain a hot-component temperature that represents less of a danger in terms of the spread of heat. This lowering is desired to be rapid. This objective has led to a mass of water of around 400 g to 1 kg stored in the reservoir or reservoirs, on the assumption that the liquid is a water-based liquid. If the device is called into operation, the liquid is injected via the inlet orifice located on the face of the outer jacket 51. The liquid then spreads through the diffusion system 13 to be discharged toward the outlet orifices placed on the inner jacket 52. At the inlet to the diffusion system, an inrush space 56, wider than the inlet line, is provided in order to manage the inlet pressure and best distribute the liquid between the various channels spreading out from the inrush space. Injection is very rapid and performed over a duration of around 0.1 second. Diffusion follows on from injection almost simultaneously. The main flow may be followed by a residual flow.

Figure 6:
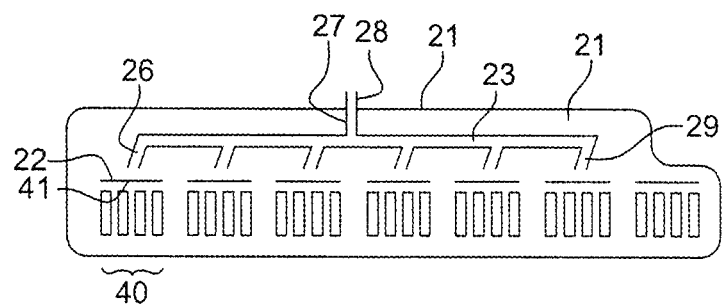
FIG. 6 shows a view in section on BB' of FIG. 5.

In a second embodiment depicted in FIGS. 5 and 6, the vehicle cover component is a battery pack cover 21 and the surface opposite is a battery module surface 22. The surface opposite may be the battery module surface directly, which in this case takes a discontinuous form because it is made up of the surface of spaced-apart battery cells 40, or may be a continuous cold plate 41 placed over the battery cell surfaces.

Likewise, following the triggering of an external command, water or some other liquid is injected into the vehicle component which in this instance is a battery cover 21, as depicted in FIG. 5. The liquid spreads through the diffusion circuit 23 as far as the outlet orifices 26 where this liquid is diffused toward the component opposite which in this instance is a battery module surface 22. The liquid flows over the target surface thanks to the terminal ends of the diffusion circuit which are either diffusion nozzles 29 or a hole as mentioned previously. The diffusion of liquid over the hot surface allows the surface temperature of the hot component to be reduced and allows this component to be cooled. In addition, various additives may be added to the liquid in order to maximize the amount of heat the liquid is able to absorb.

Application examples are not restricted to the heat screen of an exhaust manifold or to the cover of a battery pack. Thus it is conceivable to convert the cover of a battery module, for example the cold plate 41 placed over the surface of the battery cells 40, which performs a first function of covering, into a diffuser according to the invention, with components opposite it which are surfaces of battery cells.

Other embodiments following the same principle are thus conceivable.

The invention claimed is:

1. A rapid cooling device for a motor vehicle comprising:
   a motor vehicle component configured to cover a proximal surface of the motor vehicle, the component comprising a first side which is opposite to the proximal surface;
   a diffusion assembly integral to the motor vehicle component and comprising a plurality of interconnected passages extending along the vehicle component and each passage terminating at respective outlet openings in the first side such that the diffusion assembly rapidly diffuses an injected liquid toward said proximal surface, with a purpose of reducing surface temperature of the proximal surface,
   an inlet coupled to said plurality of interconnected passages of said diffusion assembly, and
   a remote pyrotechnic trigger coupled to said inlet such that gas pressure from the remote pyrotechnic trigger injects the liquid through the inlet and into the passages of the diffusion assembly under action of a pyrotechnically triggered external command.

2. The device as claimed in claim 1, wherein said passages are formed inside the vehicle component.

3. The device as claimed in claim 2, wherein the passages are of tubular shape.

4. The device as claimed in claim 1, wherein the motor vehicle component further comprises a fusible element having a liquid passing element which blocks said inlet to the diffusion assembly to prevent the liquid to pass, and which opens to allow the liquid to pass if the external liquid-injection command is triggered.

5. The device as claimed in claim 1, wherein the motor vehicle component is a heat screen of an engine compartment.

6. The device as claimed in claim 5, wherein the proximal surface is a surface of an exhaust manifold.

7. The device as claimed in claim 1, wherein the motor vehicle component is a battery pack cover and the proximal surface is a surface of a battery module.

8. The device as claimed in claim 1, wherein the liquid is water-based.

9. A motor vehicle comprising a rapid cooling device as claimed in claim 1.

10. The device as claimed in claim 1, wherein the motor vehicle component comprises a second side which is opposite to the first side, said inlet being in the second side.

11. The device of claim 1, further comprising a reservoir which stores said liquid, said reservoir not being pressurized.

* * * * *